(12) United States Patent
Williams

(10) Patent No.: US 7,380,591 B2
(45) Date of Patent: Jun. 3, 2008

(54) MECHANICAL CONNECTION SYSTEM

(76) Inventor: John R. Williams, 4500 Williams Dr. #212-404, Georgetown, TX (US) 78628

( * ) Notice: Subject to any disclaimer, the term of this patent is extended or adjusted under 35 U.S.C. 154(b) by 0 days.

(21) Appl. No.: 11/706,875

(22) Filed: Feb. 15, 2007

(65) Prior Publication Data
US 2007/0199690 A1    Aug. 30, 2007

Related U.S. Application Data

(63) Continuation of application No. 10/829,675, filed on Apr. 22, 2004, now Pat. No. 7,198,098.

(51) Int. Cl.
*E21B 33/06* (2006.01)
*E21B 3/04* (2006.01)
(52) U.S. Cl. ................ 166/84.3; 175/195; 285/361
(58) Field of Classification Search ............... 166/84.3; 175/195
See application file for complete search history.

(56) References Cited

U.S. PATENT DOCUMENTS

| | | | |
|---|---|---|---|
| 25,283 A | 8/1859 | Smith | |
| 2,610,820 A | 9/1952 | Markel | |
| 3,173,502 A | 3/1965 | Overby | |
| 4,486,025 A * | 12/1984 | Johnston | 277/343 |
| 4,531,580 A | 7/1985 | Jones | |
| 4,585,077 A | 4/1986 | Bergler | |
| 4,678,572 A | 7/1987 | Hehl | |
| 4,754,820 A | 7/1988 | Watts et al. | |
| 7,198,098 B2 * | 4/2007 | Williams | 166/84.3 |

* cited by examiner

*Primary Examiner*—David J. Bagnell
*Assistant Examiner*—Robert E Fuller
(74) *Attorney, Agent, or Firm*—David O. Simmons

(57) ABSTRACT

A connector system is provided for connecting parts of an apparatus. A first part having one or more bayonet connectors and one or more retention pin receptacles cooperatively mates to a second part having one or more mating bayonet connectors. The second part further provides one or more retention pin bores. The first and second parts assemble to form a bayonet connection such that at least one pin retention bore aligns with at least one retention pin receptacle. At least one retention pin assembly disposed through the at least one pin retention bore selectively engages the retention pin receptacle to secure the connection of the first part to the second part of the apparatus.

18 Claims, 7 Drawing Sheets

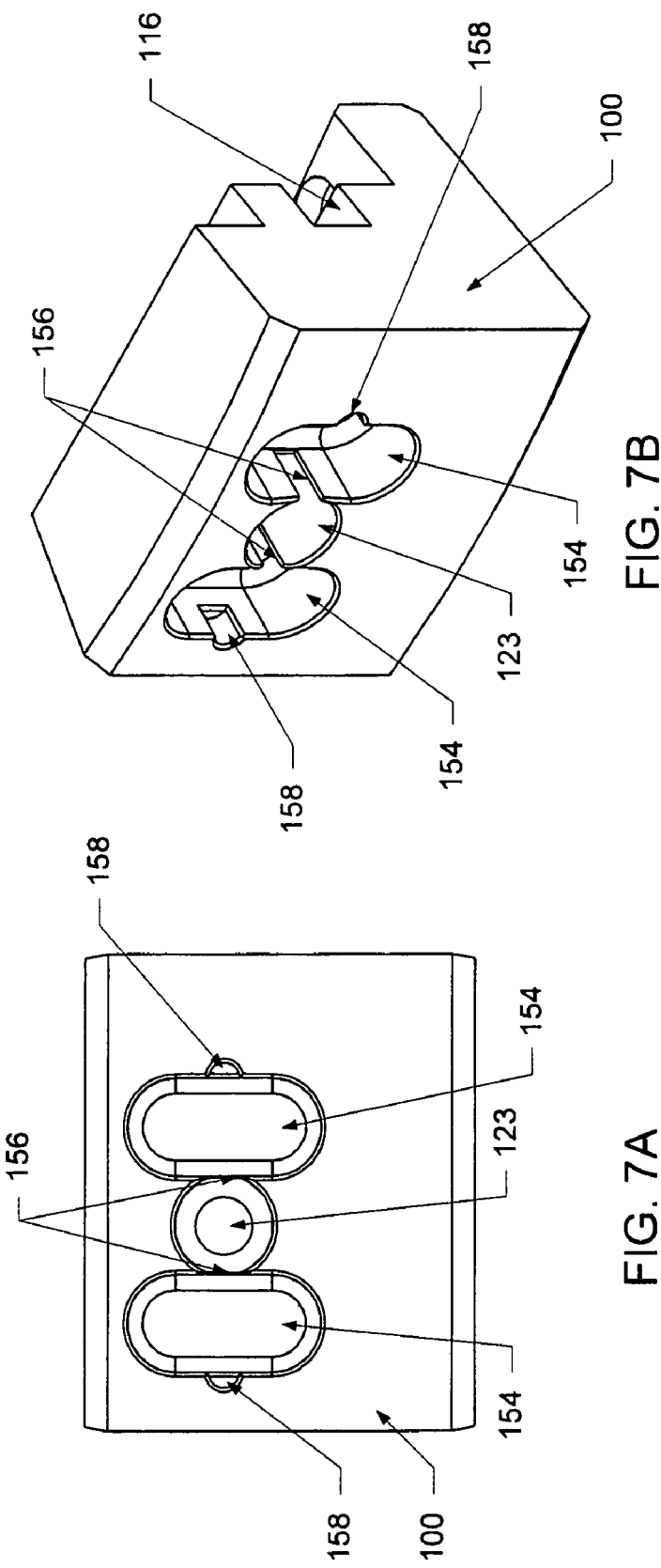

MECHANICAL CONNECTION SYSTEM

CROSS-REFERENCE TO RELATED APPLICATIONS

The present application is a continuation of and claims priority from patent application Ser. No. 10/829,675 of the same title and by the present inventor, filed Apr. 22, 2004 now U.S. Pat No. 7,198,098.

FIELD OF THE DISCLOSURE

The present disclosure relates to connectors and connector systems for making mechanical connections. More particularly, the disclosure provides apparatus, systems and methods for connecting or disconnecting a stripper rubber to or from equipment, such as a bearing assembly, of a drilling head to pressure-seal the interior of a well bore for the circulation, containment or diversion of drilling fluid through the well during drilling operations.

BACKGROUND

Oil, gas, water and geothermal wells are typically drilled with a drill bit connected to a hollow drill string which is inserted into a well casing cemented in the well bore. A drilling head is attached to the well casing, wellhead or to associated blowout preventer equipment, for the purposes of sealing the interior of the well bore from the surface and facilitating forced circulation of drilling fluid through the well while drilling or diverting drilling fluids away from the well. Drilling fluids include, but are not limited to, water, steam, drilling muds, air, and other gases.

In the forward circulation drilling technique, drilling fluid is pumped downwardly through the bore of the hollow drill string, out the bottom of the hollow drill string and then upwardly through the annulus defined by the drill string and the interior of the well casing, or well bore, and subsequently out through a side outlet above the well head. In reverse circulation, a pump impels drilling fluid through a port, down the annulus between the drill string and the well casing, or well bore, and then upwardly through the bore of the hollow drill string and out of the well.

Drilling heads typically include a stationary body, often referred to as a bowl, which carries a rotatable spindle such as a bearing assembly, rotated by a kelly apparatus or top drive unit. One or more seals or packing elements, sometimes referred to as stripper packers or stripper rubbers, is carried by the spindle to seal the periphery of the kelly or the drive tube or sections of the drill pipe, whichever may be passing through the spindle and the stripper rubber, and thus confine or divert the pore pressure in the well to prevent the drilling fluid from escaping between the rotating spindle and the drilling string.

Rotating blowout preventers and diverters are well known to those of ordinary skill in the art of well pressure control. Rotation of the diverter/preventer is facilitated by a sealing engaged bearing assembly through which the drill string rotates relative to the stationary bowl or housing in which the bearing assembly is seated. Typically, a rubber o-ring seal, or similar seal, is disposed between the stripper rubber and the bearing assembly to improve the connection between the stripper rubber and the bearing assembly.

Pressure control is achieved by means of one or more stripper rubbers connected to the bearing assembly and disposed around the drill string. At least one stripper rubber rotates with the drill string. Stripper rubbers typically taper downward and include rubber or other resilient substrate so that the down hole pressure pushes up on the rubber, pressing the rubber against the drill string to achieve a fluid-tight seal. Stripper rubbers often further include metal inserts that provide support for bolts or other attachment means and which also provide a support structure to minimize deformation of the rubber cause by down hole pressure forces acting on the rubber.

Stripper rubbers are connected or adapted to equipment of the drilling head to establish and maintain the pressure control seal around a down hole tubular. It will be understood by those skilled in the art that a variety of means are used to attach a stripper rubber to the equipment above it. Such attachment means include bolting from the top, bolting from the bottom, screwing the stripper rubber directly onto the equipment via cooperating threaded portions on the top of the stripper rubber and the bottom of the equipment, and clamps.

It will be understood that, depending on the particular equipment being used at a drilling head, a stripper rubber at one well may be connected to equipment specific to that well while at another well a stripper rubber is connected to different equipment. For example, at one well the stripper rubber may be connected to the bearing assembly while at another well the stripper rubber may be connected to an inner barrel or an accessory of the drilling head. While the present disclosure is made here in relation to connecting the stripper rubber to the bearing assembly, it will be evident that the disclosure contemplates connection of the stripper rubber to any selected equipment of the drilling head.

It is common practice to tighten the bolts or screws of the connection with heavy wrenches and sledge hammers. The practice of using heavy tools to tighten a bolt, for example, can result in over-tightening, to the point where the threads or the bolt head become stripped. The results of over-tightening include stripped heads, where the bolt or screw cannot be removed, or stripped threads, where the bolt or screw has no grip and the connection fails. Both results are undesirable.

Even worse, vibration and other drilling stresses can cause bolts or screws to work themselves loose and fall out. If one or more falls downhole, the result can be catastrophic. The drill bit can be ruined. The entire drillstring may have to tripped out, and substantial portions replaced, including the drill bit. If the well bore has been cased, the casing may be damaged and have to be repaired.

Drilling head assemblies periodically need to be disassembled to replace stripper rubbers or other parts, lubricate moving elements and perform other recommended maintenance. In some circumstances, stripped or over tightened bolts or screws make it very difficult if not impossible to disengage the stripper rubber from the drilling head assembly to perform recommended maintenance or parts replacement.

As modern wells are drilled ever deeper, or into certain geological formations, very high temperatures and pressures may be encountered at the drilling head. These rigorous drilling conditions pose increased risks to rig personnel from accidental scalding, burns or contamination by steam, hot water and hot, caustic well fluids. There is a danger of serious injury to rig workers when heavy tools are used to make a stripper rubber connection at the drilling head. The connection should be made quickly and achieve a fluid tight seal.

It is desirable, therefore, to obtain a connector for optionally connecting a stripper rubber assembly to a bearing assembly, or other equipment, of a drilling head that is effective, safe, simple, fast and elegant.

BRIEF DESCRIPTION OF THE DRAWINGS

The present disclosure is further made in the detailed description that follows, by reference to the noted drawings, by way of non-limiting examples of embodiments in which like reference numerals represent similar parts throughout several views of the drawings, and in which:

FIG. 7A is a side view schematic drawing of a detail of a stripper rubber insert of the connector system of the present disclosure, showing a retention pin bore of the embodiment of FIG. 6.

FIG. 7B is an isometric view schematic drawing of the retention pin bore of FIG. 7A.

DETAILED DESCRIPTION

Figure 1:
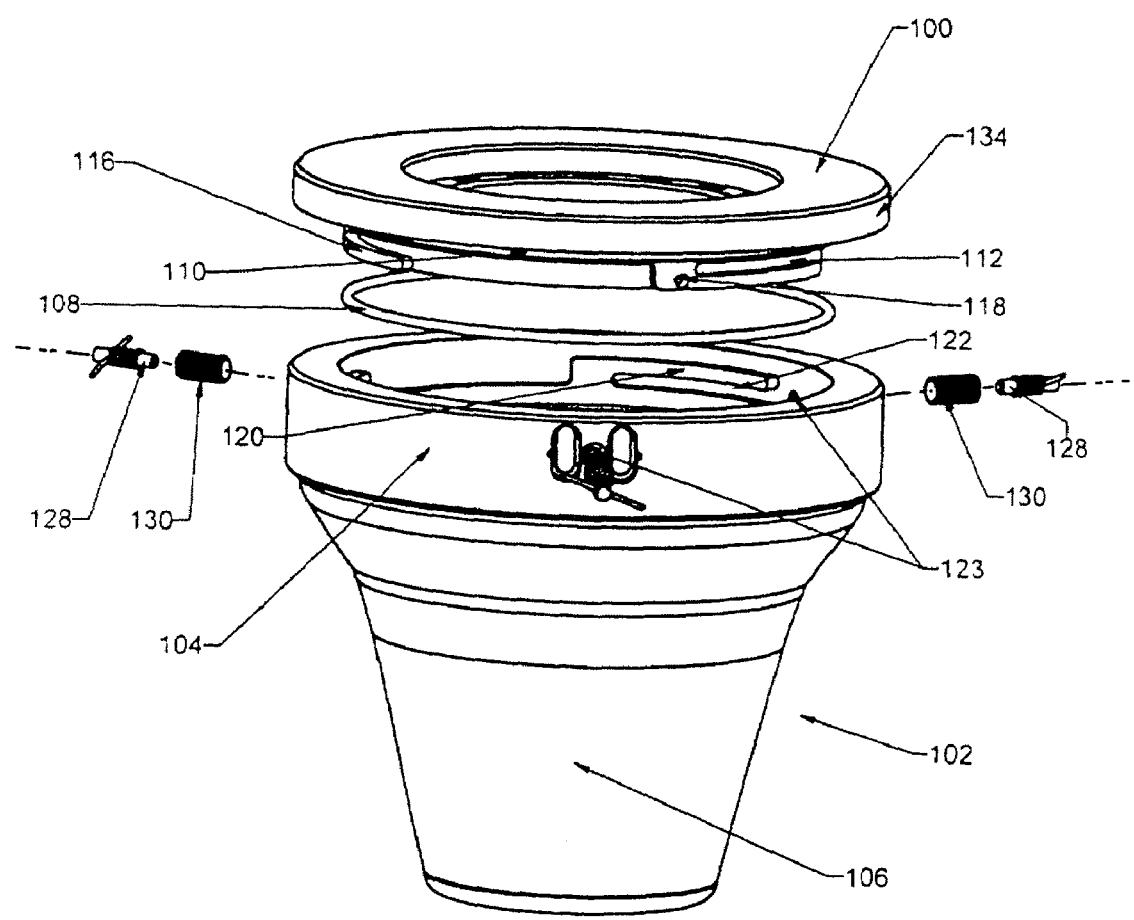
FIG. 1 is a side, isometric, exploded-view schematic drawing of a connector system of one embodiment of the present disclosure.

In view of the foregoing, the present disclosure, through one or more various aspects, embodiments and/or specific features or sub-components, is thus intended to bring out one or more of the advantages that will be evident from the description. The present disclosure is made with frequent reference to stripper rubbers. It is understood, however, that a stripper rubber connector is merely an example of a specific embodiment, but that the disclosure is more broadly directed to connectors and systems and methods for making connections within the scope of the disclosure. The terminology, examples, drawings and embodiments, therefore, are not intended to limit the scope of the disclosure.

Oil and gas wells are drilled with a drill bit attached to a hollow drill string which passes down through a well casing installed in the well bore. A drilling head attached to the top of the well casing, where it emerges from the ground, to seal the interior of the well casing from the surface, permits the forced circulation or diversion of drilling fluid or gas during drilling operations. In the forward circulation drilling mode, the drilling fluid or gas is pumped down through the interior of the hollow drill string, out the bottom thereof, and upward through the annulus between the exterior of the drill string and the interior of the well casing. In reverse circulation, the drilling fluid or gas is pumped down the annulus between the drill string and the well casing (or well bore) and then upward through the hollow drill string.

Drilling heads often include a stationary body that carries a rotatable spindle such as a bearing assembly that is rotated by a kelly or top drive unit that drives the rotary drilling operation. A seal or packing, often referred to as a stripper rubber or packer, is carried by the spindle to seal the periphery of the kelly or the sections of drill pipe, whichever is passing through the spindle, and thereby confines the fluid pressure in the well bore and prevents the drilling fluid, whether liquid or gas, from escaping between the rotary spindle and the drill string.

Stripper packers provide rotational and slideable sealing of the drill string within the drilling head. The rotation of the kelly and drill string, the frequent upward and downward movement of the kelly and drill string during addition of drill pipe sections, and the high pressures to which the drilling head is subjected, demand that the consumable packing components of the drilling head be able to be quickly and securely replaced. As modern oil and gas wells go to greater depths having greater down hole bore pressures, ever more reliable means of sealing the drill string against release of internal drilling fluid pressure are sought.

The attachment of the stripper packer to the inner barrel of the drilling head is important in the containment or diversion of drilling fluid under bore hole pressure. Typically, the stripper packer includes an elongated generally cylindrical hard-rubber packer having an annular mounting collar secured to its upper end. The mounting collar of the packer, in turn, is secured onto the lower end of the spindle by any one of a variety of means, including bolting from the top, bolting from the bottom, screwing on with cooperating threaded potions or with a mounting clamp that is screwed or bolted tight for a positive mechanical interlock between the spindle mounting flange and the stripper rubber collar.

The art has not produced many viable alternatives to the above-described structures due, in part, to the difficulty of forming a suitable releasable yet reliable connection between a drilling head and a stripper rubber. This has been particularly true in those cases where the frictional engagement between the stripper rubber and the drill string provides the rotary driving force for the rotary spindle in the drilling head. In such instances, the stripper rubber is under constant torque loading and this tends to accelerate wear and ultimate failure of the rubber-to-spindle seal.

The present disclosure provides a stripper rubber adapter, or top ring, that eliminates the aforementioned bolts, screws, threads, and clamps, and which is selectively detachable from the drilling head. When assembled, a top ring of the present disclosure optionally bolts to the bottom of the spindle of the drilling head, and the stripper rubber couples to the top ring by the selectively lockable engagement of one or more bayonet connections. Additionally, seals such as o-rings, for example, which function between the stripper rubber and the adapter, effectively prevent pressurized fluids from leaking around the stripper rubber and compromising the fluid containment of the drilling head. The stripper rubber is thereby maintained in compressive engagement with the drillstring to provide a fluid-tight and pressure-tight seal therebetween, and supports the rotary torque loads transmitted via the stripper rubber from the rotating drill string to the rotary spindle.

Turning now to the drawings, FIG. 1 is a side, isometric, exploded-view schematic drawing of a connector system of one embodiment of the present disclosure. The depicted embodiment is that of a stripper rubber. The stripper rubber embodiment provides top ring 100 and bottom stripper rubber 102 having insert 104. Sealing element 108, such as a rubber o-ring, for example, is disposed between top ring 100 and stripper rubber 102.

Top ring 100 provides one or more annular female partial grooves 112 and one or more annular male bayonets 116 positioned around the exterior of the lower portion of top ring 100. One or more retention pin receptacles 118 are also disposed around the exterior of top ring 100.

Stripper rubber insert 104 provides one or more annular male bayonets 120 and one or more annular female partial grooves 122. Bayonets 120 and partial grooves 122 are positioned around the interior of insert 104 and oriented to mate with corresponding groove 112 and bayonet 116 of top ring 100 upon clock-wise rotation of stripper rubber 102 to form a bayonet-type connection between stripper rubber 102 and top ring 100.

Stripper rubber insert 104 further provides one or more retention pin holes or bores 123 that align with retention pin receptacles 118 of top ring 100 when stripper rubber 102 is rotated clock-wise into full mating position with top ring 100. Retention pin bores 123 may be at least partially threaded to secure retention of threaded retention pin bore insert 130 (see FIG. 6). One or more retention pin assemblies 128 are adapted to fit through bores 123 and into retention pin receptacles 118 to secure the connection of top ring 100 to stripper rubber 102.

Figure 2B:
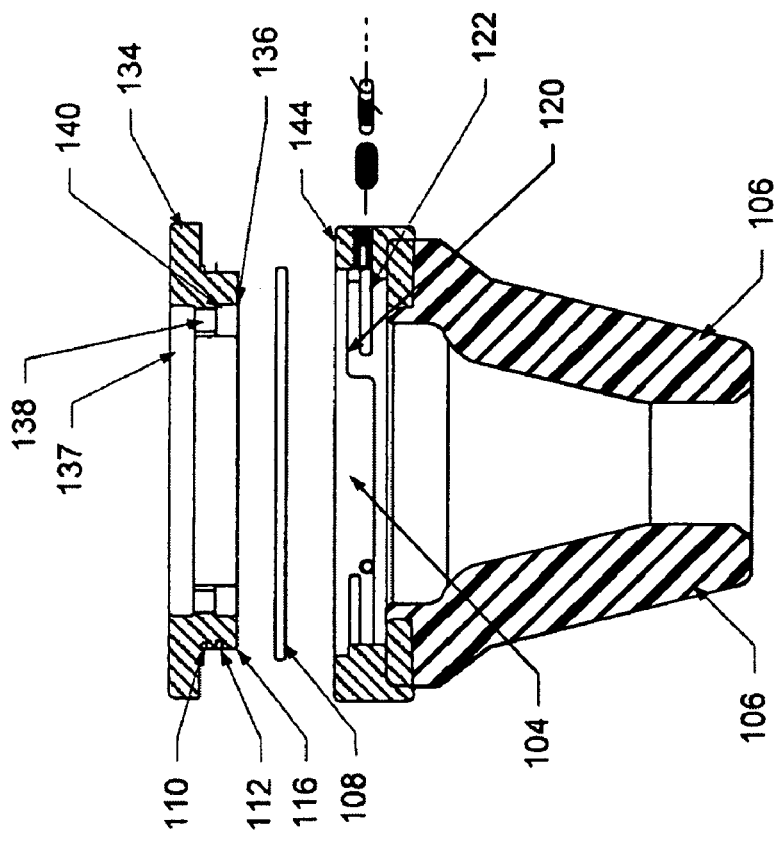
FIG. 2 is a cross-section side view schematic drawing of the system of FIG. 1, bisected along line I-I.
Figure 2A:
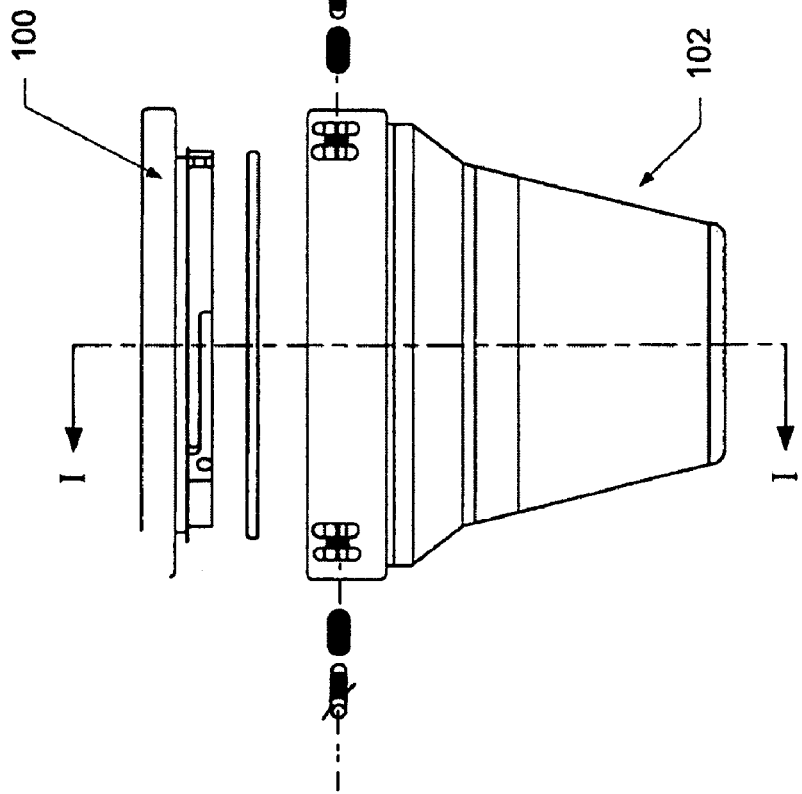

FIG. 2 is a cross-section side view schematic drawing of the system of FIG. 1, bisected through line I-I. Top ring 100 is above stripper rubber 102. The upper portion of top ring 100 provides annular lip 134 which extends radially outward to seat on stripper rubber insert 104. Annular o-ring groove 110, substantially adjacent to and underneath lip 134, is adapted to receive o-ring seal 108. Female partial groove 112 and male bayonet 116 are disposed, respectively, beneath o-ring groove 110.

One or more threaded mounting holes or bores 136 extend through annular inner portion 137 of top ring 100. Each mounting bore 136 provides shaft portion 138, to receive the shaft of a bolt or screw, and bolt or screw head receptacle 140. Top ring 100 may thereby be bottom-bolted to drillstring or drilling head equipment with bolts or screws oriented upward through bores 136. The heads of the bolts or screws sit in bolt head receptacles 140 so as not to extend substantially beyond flush with the bottom surface of top ring 100.

Stripper rubber 102 provides resilient sealing element 106 and stripper rubber insert 104. Top ring 100 mounts in stripper rubber insert 104 so that lip 134 rests on top surface 144 of insert 104. The interior surface of insert 104 is formed or machined to provide one or more insert bayonets 120 and one or more female insert partial grooves 122. Insert bayonets 120 and grooves 122 are oriented to matingly engage corresponding grooves 112 and bayonets 116 of top ring 100.

Figure 3:
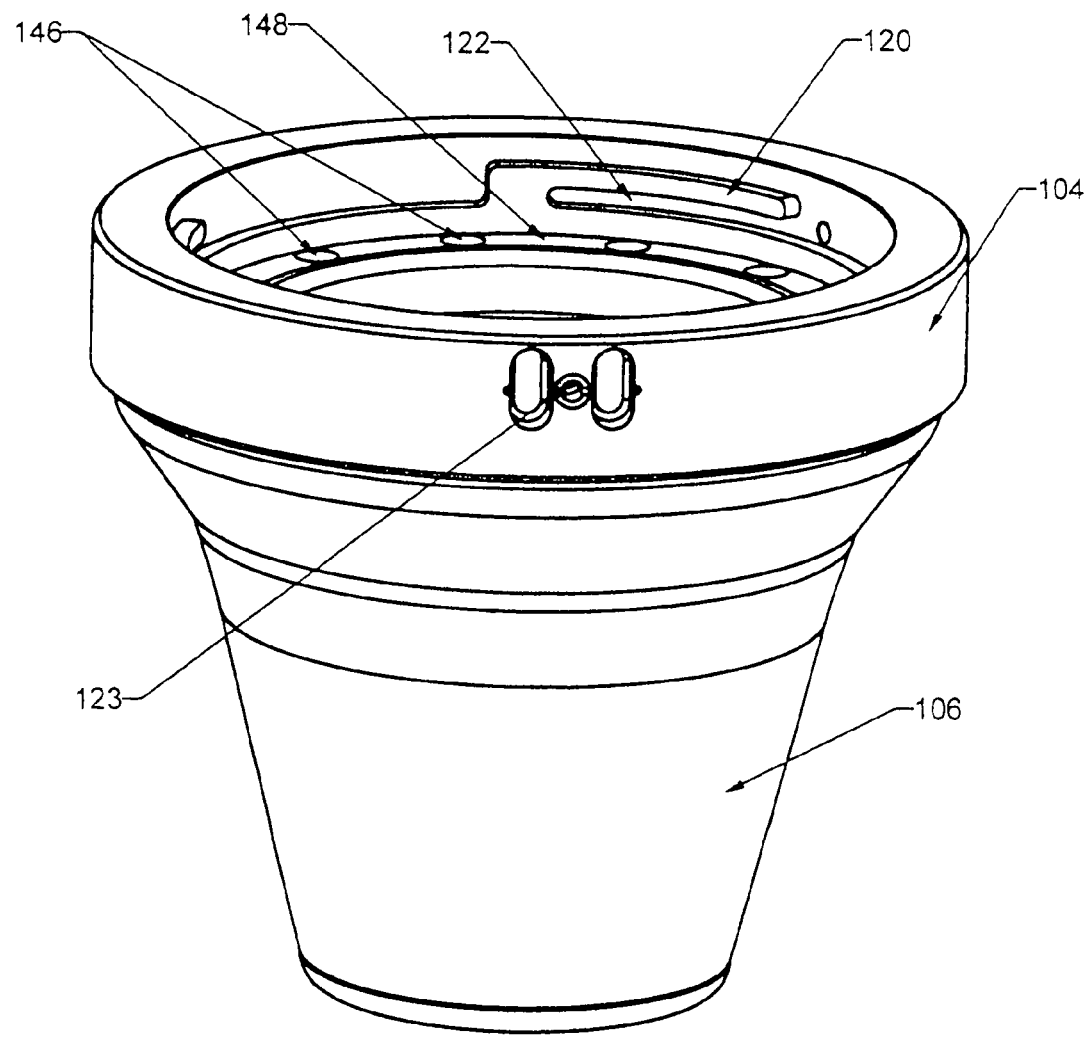
FIG. 3 is a side isometric view schematic drawing of a stripper rubber of one embodiment of the present disclosure.

FIG. 3 is a side, isometric, view, schematic drawing of a stripper rubber of one embodiment of the present disclosure. The interior surfaces of stripper rubber insert 104 are shaped to achieve defined functions of the present disclosure. The upper interior side surface is shaped by molding or machining to provide one or more bayonets 120 and partial grooves 122. The lower portion of insert 104 provides annular interior shoulder 148 having one or more perforations 146 which are filled with the cured elastomeric material that forms resilient sealing element 106. One or more pin assembly bores 123 (see FIG. 7) are positioned around insert 104 to accommodate retention pin assemblies 128 of the present disclosure.

Stripper rubber insert 104 further provides an annular interior portion having one or more perforations 146. During manufacture of stripper rubber 102, a substantially elastomeric material is in a fluid state so that the material flows through perforations 146. Upon curing, the fluid elastomeric material partially hardens to form at least partially resilient sealing element 106. Furthermore, the elastomeric material partially hardens around annular interior portion 148 of stripper rubber insert 104 and through perforations 146 to substantially embed interior portion 148 in resilient sealing element 106.

Figure 4:
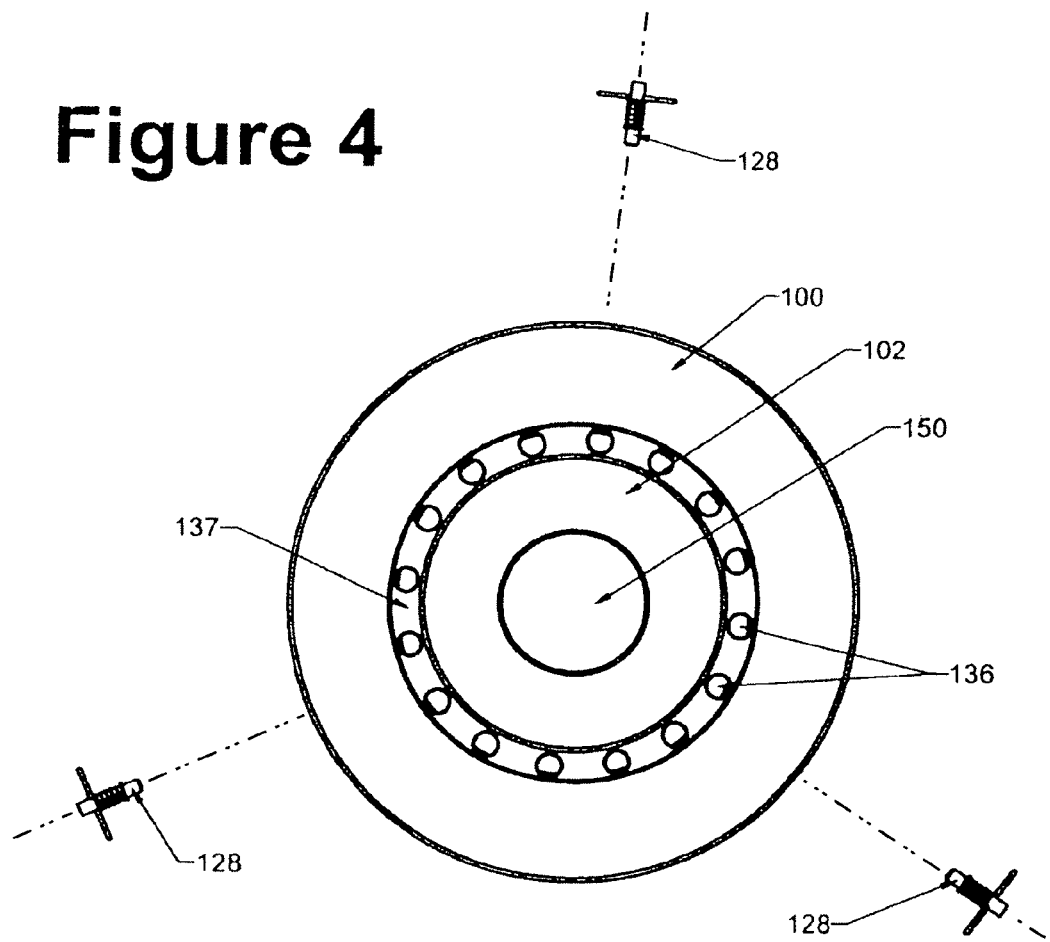
FIG. 4 is a top view schematic drawing of the system of FIG. 1.

FIG. 4 is a top view schematic drawing of the system of FIG. 1. Substantially ring-shaped top ring 100 is mounted on stripper rubber 102. A plurality of mounting bores 136 are positioned around interior annular shoulder 137 of top ring 100. Mounting bores 136 facilitate bolting top ring 100 to an article of drilling head equipment, such as a bearing assembly. In certain embodiments of the disclosure, bores 136 are at least partially threaded.

Figure 5:
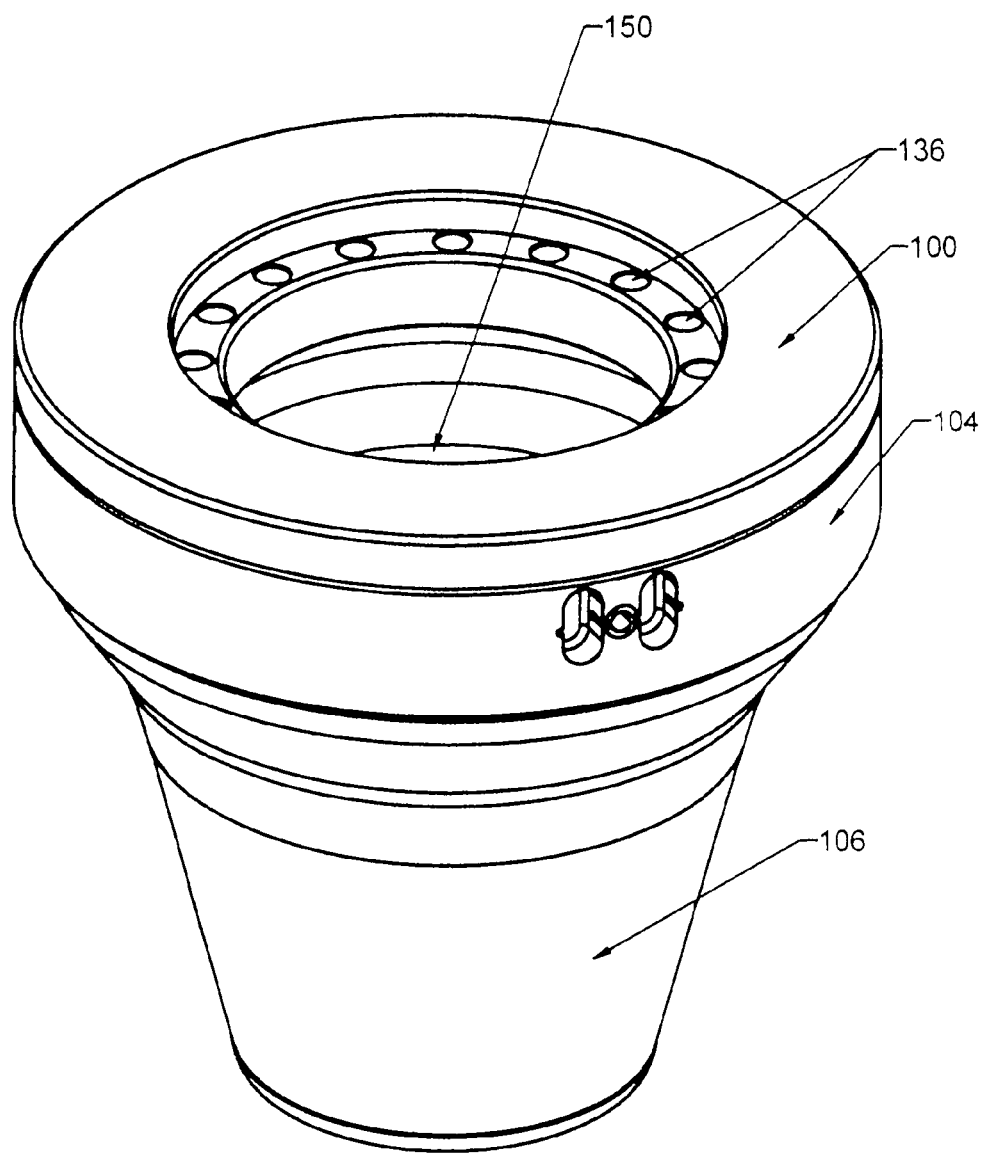
FIG. 5 is a isometric view schematic drawing of a connector system of the present disclosure, assembled but for the retention pin assemblies.

FIG. 5 is an isometric view schematic drawing of a connector system of the present disclosure, assembled but for the retention spring assemblies. Top ring 100 with mounting bores 136 is attached to stripper rubber insert 104 by bayonet connections. Resilient sealing element 106 extends longitudinally from insert 104 with a substantially frusto-conical shape to sealingly receive a drillstring or drill string equipment through primary bore 150.

Figure 6:
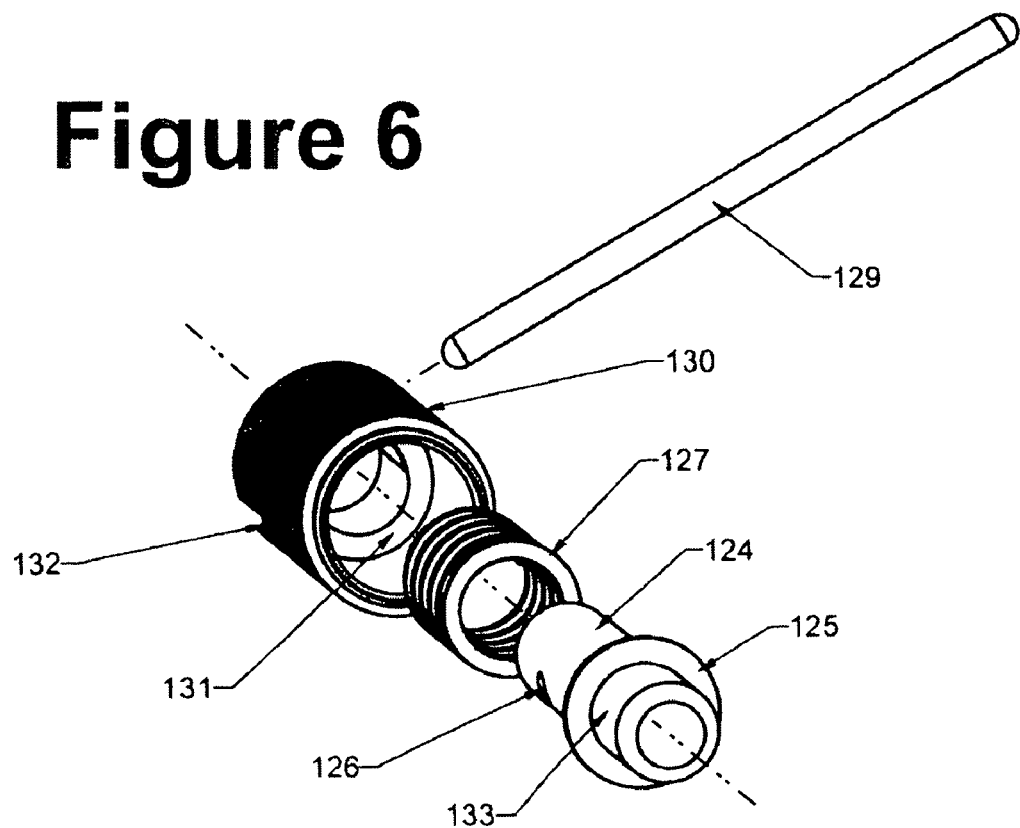
FIG. 6 is an exploded, isometric-view, schematic drawing of a retention pin assembly one embodiment of the present disclosure.

FIG. 6 is an exploded, isometric-view, schematic drawing of a retention pin assembly 128 one embodiment of the present disclosure. Retention pin 124 provides proximate flange 125, which stops spring 127. Pin handle bore 126 receives pin handle 129. Spring 127, disposed around pin 124 which is rotatably disposed within retention pin insert or sleeve 130, is compressed between flange 125 and shoulder 131 within insert 130. Retention pin 124 extends through the distal end of insert 130 so that handle bore 126 is exposed and pin handle 129 can be inserted through bore 126.

While spring 127 is in a compressed state, handle 129 is rotated to an oblique orientation with respect to slot 132. The entire retention pin assembly 128 is inserted within a retention pin bore of stripper rubber insert 104. Upon mounting top ring 100 to stripper rubber 102 and rotating stripper rubber 102 to achieve the bayonet connection, the retention pin bores of the stripper rubber insert are aligned with corresponding retention pin receptacle of the top ring. Pin handle 129 may then be rotated so that pin handle 129 laterally aligns with slot 132, thereby at least partially releasing compressed spring 127 to push pin 124 toward pin receptacle 118 so that proximate end 133 of pin 124 is received by pin receptacle 118 and secured in position by compression forces from spring 127. The bayonet connection of the present disclosure is thereby further assured with a spring-biased retention pin.

FIG. 7A is a side view schematic drawing of a detail of stripper rubber insert 104, showing a retention pin bore 123 of the embodiment of FIG. 6. Retention pin bore 123 is designed to receive a retention pin assembly (not shown in FIG. 7A or B) such as that depicted in FIG. 6. Bore 123 is female threaded (not shown) to receive male threaded retention pin bore insert 130, together with retention pin assembly 128. Finger recesses 154 on either side of bore 123 permit handle 129 to be grabbed by an operator's fingers to extract pin assembly 128 from bore 123.

FIG. 7B is an isometric view schematic drawing of the retention pin bore of FIG. 7A. Bore 123 provides slots 156 to receive pin handle 129. Slots 156 do not extend all the way to the bottom of finger recesses 154 so that an operator's fingers can grasp pin handle 129 to extract pin assembly 128. Likewise, pin handle recesses 158 receive the ends of pin handle 129 so as to permit pin handle 129 to be grasped.

The connector system of the present disclosure provides a bayonet-type connection between an article of drilling head equipment and a stripper rubber. More generically, however, the present disclosure describes a system for circular connections, such as connecting tubes together, connecting a tool to a tube, connecting a tube to a flange or for connecting a tool to a flange. The combination of the top ring or adapter with the stripper rubber insert, of the stripper rubber embodiment described above as a mere example of a connection system of the present disclosure, is easily generalized by those of ordinary skill in the art to a wide variety of mechanical connection applications, including but not limited to those identified above.

With respect to the specific means, features and elements of stripper rubber connection example, numerous variations will be apparent to those of ordinary skill in the art from the preceding exemplary description. For example securing the bayonet connection may be achieved by means other than the pin assembly, pin bore, and pin receptacle described above. Other means include but are not limited to bolts or screws. Certain alternative embodiments, however, may forego the retention pins, to rely entirely on the bayonet connection.

The present disclosure describes a connection system for connecting parts of an apparatus. A first part having one or more bayonet connectors and one or more retention pin receptacles cooperatively mates to a second part having one or more mating bayonet connectors. The second part further provides one or more retention pin bores. The first and second parts assemble to form a bayonet connection such that at least one pin retention bore aligns with at least one retention pin receptacle. At least one retention pin assembly disposed through the at least one pin retention bore selectively engages the retention pin receptacle to secure the connection of the first part to the second part of the apparatus.

Each retention pin assembly may include a retention pin bore sleeve having a spring stop; a spring seated within the sleeve; a pin, also having a spring stop, rotatably disposed through the spring, and a removable pin handle connected to the pin distally from the pin spring stop. The pin selectively engages the retention pin receptacle with a spring-loaded bias to secure the connection of the first part to the second part of the apparatus. Alternative embodiments of the retention pin assembly provide a bolt or a screw, or any of a variety of suitable means for securing the bayonet connection.

The first part of the apparatus may be, for example drilling head equipment, such as an inner barrel or a bearing assembly. Alternatively, the first part may be a connector adapter that provides means for connecting the adapter to a part of the apparatus and also provides the bayonet and retention pin connector system, described above, to connect the adapter to another part of the apparatus.

The second part may be a stripper rubber, which typically includes an insert that provides means for connecting the rubber to a piece of drilling head equipment, such as an inner barrel or a bearing assembly. In some embodiments, the top ring of the present disclosure serves as an adapter between the stripper rubber and, for example, the bearing assembly, to facilitate the connection.

Particular embodiments of the present disclosure provide an assembly for connecting a stripper rubber to drilling head equipment. The assembly includes, but is not limited to, an adapter having one or more bayonet connectors for connecting the adapter to the stripper rubber, and means for connecting the adapter to the drilling head equipment. The adapter further provides one or more retention pin receptacles to receive at least one retention pin. A stripper rubber having one or more bayonet connectors, and one or more retention pin bores, cooperatively mates with the adapter bayonet connector to assemble a bayonet connection such that at least one pin retention bore aligns with at least one retention pin receptacle. At least one retention pin assembly, disposed through the at least one pin retention bore, selectively engages the retention pin receptacle to secure the connection of the adapter to the stripper rubber.

In stripper rubber embodiments of the disclosure, it is recommended that the bayonets and grooves be oriented so that the bayonets and grooves of the equipment, or the adapter, mate with the bayonets and grooves of the stripper rubber, or the stripper rubber insert, upon counter-clockwise rotation of the stripper rubber, or the stripper rubber insert. That is, a left-handed bayonet connection is recommended. A left-handed connection is recommended because, in field operation, stripper rubbers typically rotate clockwise, with the drillstring, so a left-handed orientation reinforces the bayonet connection with a self-tightening action.

Additionally, the present disclosure describes an adapter for connecting parts of an apparatus. The adapter includes one or more bayonet connector structures that mate with corresponding structures on a first part of the apparatus to form a bayonet-type connection. Means for connecting the adapter to a second part of the apparatus may be provided, for example, by bores disposed through the adapter to receive bolts or screws so that the adapter can be bolted onto the apparatus. One or more retention pin receptacles that selectively receive a retention pin through the first part of the apparatus to secure the bayonet-type connection.

Although the disclosure has been made with reference to several exemplary embodiments, it is understood that the words that have been used are words of description and illustration, rather than words of limitation. Changes may be made within the purview of the appended claims, as presently stated and as amended, without departing from the scope and spirit of the disclosure in all its aspects. Although the disclosure has been made with reference to particular means, materials and embodiments, the disclosure is not intended to be limited to the particulars disclosed; rather, the disclosure extends to all functionally equivalent technologies, structures, methods and uses such as are within the scope of the appended claims.

I claim:

1. A stripper rubber system, comprising:
a stripper rubber including a resilient sealing portion and an insert disposed at least partially within the resilient sealing portion, wherein the insert includes a plurality of bayonet connector structures; and
an adapter including a drill head equipment engaging structure and a corresponding plurality of mating bayonet connector structures,
wherein each one of said mating bayonet connector structures is configured for being selectively engaged with one of said insert bayonet connector structures for connecting the stripper rubber to the adapter;
wherein the drill head engaging structure is configured for being engaged with a mating portion of drilling head equipment for attaching the adapter to said drilling head equipment;
wherein a space at least as long as one of said adapter bayonet connector structures is provided between adjacent ones of said insert bayonet connector structures; and
wherein a space at least as long as one of said insert bayonet connector structures is provided between adjacent ones of said adapter bayonet connector structures.

2. The stripper rubber system of claim 1 wherein:
all of said adapter bayonet connector structures are substantially the same length; and
all of said insert bayonet connector structures are substantially the same length.

3. The stripper rubber system of claim 1, further comprising:
one or more spring-biased retention pins disposed in the insert and configured for engaging a mating retention portion of the adapter for securing the insert and the adapter in mated engagement.

4. A stripper rubber system, comprising:
a stripper rubber including a resilient sealing portion and an insert disposed at least partially within the resilient sealing portion, wherein the insert includes a plurality of bayonet connector structures; and
an adapter including a drill head equipment engaging structure and a corresponding plurality of mating bayonet connector structures,
wherein each one of said mating bayonet connector structures is configured for being selectively engaged with one of said insert bayonet connector structures for connecting the stripper rubber to the adapter;
wherein the drill head engaging structure is configured for being engaged with a mating portion of drilling head equipment for attaching the adapter to said drilling head equipment;
wherein each one of said bayonet connector structures includes an engagement groove;
wherein the engagement groove includes a closed end portion and an open end portion;
wherein an elongated edge portion of the engagement groove is defined by an elongated raised rib member extending at least partially along the engagement groove;
wherein the engagement groove of each one of said insert bayonet connector structures and the rib member of each one of said adapter bayonet connector structures are jointly configured for allowing the rib member of each adapter bayonet connector structures to be slideably received within the engagement groove of a respective one of said insert bayonet connector structures through relative rotation between the insert and the adapter when the insert and the adapter are in a mated orientation such that the rib member of each adapter bayonet connector structures is aligned with the engagement groove of the respective one of said insert bayonet connector structures; and
wherein the engagement groove of each one of said adapter bayonet connector structures and the rib member of each one of said insert bayonet connector structures are jointly configured for allowing the rib member of each insert bayonet connector structures to be slideably received within the engagement groove of a respective one of said adapter bayonet connector structures through relative rotation between the insert and the adapter when the insert and the adapter are in the mated orientation.

5. The stripper rubber system of claim 4 wherein:
a space at least as long as one of said adapter bayonet connector structures is provided between adjacent ones of said insert bayonet connector structures; and
a space at least as long as one of said insert bayonet connector structures is provided between adjacent ones of said adapter bayonet connector structures.

6. The stripper rubber system of claim 5 wherein:
all of said adapter bayonet connector structures are substantially the same length; and
all of said insert bayonet connector structures are substantially the same length.

7. The stripper rubber system of claim 4, further comprising:
one or more spring-biased retention pins disposed in the insert and configured for engaging a mating retention portion of the adapter for securing the insert and the adapter in mated engagement.

8. The stripper rubber system of claim 7 wherein:
a space at least as long as one of said adapter bayonet connector structures is provided between adjacent ones of said insert bayonet connector structures;
a space at least as long as one of said insert bayonet connector structures is provided between adjacent ones of said adapter bayonet connector structures;
all of said adapter bayonet connector structures are substantially the same length; and
all of said insert bayonet connector structures are substantially the same length.

9. A stripper rubber system, comprising:
a stripper rubber including a resilient sealing portion and an insert disposed at least partially within the resilient sealing portion, wherein the insert includes at least one adapter engagement groove extending partially around a perimeter edge portion thereof, wherein said at least one adapter engagement groove includes a closed end portion and an open end portion, and wherein an elongated edge portion of said at least one adapter engagement groove is defined by a respective elongated raised rib member extending at least partially therewith;
an adapter including a drill head equipment engaging structure and at least one insert engagement groove extending partially around a perimeter edge portion thereof, wherein said at least one insert engagement groove includes a closed end portion and an open end portion, and wherein an elongated edge portion of said at least one insert engagement groove is defined by a respective elongated raised rib member extending at least partially therewith;
wherein said at least one adapter engagement groove and said one adapter rib member are jointly configured for allowing said one adapter rib member to be slideably received within said at least one adapter engagement groove through relative rotation between the insert and the adapter when the insert and the adapter are in a mated orientation such that said one adapter rib member is aligned with said at least one adapter engagement groove; and
wherein said at least one insert engagement groove and said one insert rib member are jointly configured for allowing said one insert rib member to be slideably received within said at least one insert engagement groove through said relative rotation between the insert and the adapter when the insert and the adapter are in the mated orientation.

10. The stripper rubber system of claim 9, further comprising:
one or more spring-biased retention pins disposed in the insert and configured for engaging a mating retention portion of the adapter for securing the insert and the adapter in mated engagement.

11. The stripper rubber system of claim 9 wherein:
the insert includes a plurality of adapter engagement grooves and a plurality of corresponding rib members;
the adapter includes a plurality of insert engagement grooves and a plurality of corresponding rib members;
a space at least as long as one of said rib members of the insert is provided between adjacent ones of said rib members of the adapter; and
a space at least as long as one of said rib members of the adapter is provided between adjacent ones of said rib members of the insert.

12. The stripper rubber system of claim 11 wherein all of said engagement grooves are substantially the same length; and
all of said rib members are substantially the same length.

13. The stripper rubber system of claim 11, further comprising:
one or more spring-biased retention pins disposed in the insert and configured for engaging a mating retention portion of the adapter for securing the insert and the adapter in mated engagement.

14. A stripper rubber configured for being engaged with an adapter including at least one insert engagement groove extending partially around a perimeter edge portion thereof, wherein said at least one insert engagement groove includes a closed end portion and an open end portion and wherein an elongated edge portion of said at least one insert engagement groove is defined by a respective elongated raised rib member extending at least partially therewith, comprising:
a resilient sealing portion; and
an insert disposed at least partially within the resilient sealing portion, wherein the insert includes an adapter engagement groove extending partially around a perimeter edge portion thereof, wherein the adapter engagement groove includes a closed end portion and an open end portion, and wherein an elongated edge portion of the adapter engagement groove is defined by an elongated raised rib member extending at least partially therewith thereby providing a bayonet-like connection structure.

15. The stripper rubber of claim 14, further comprising:
one or more spring-biased retention pins disposed in the insert and configured for engaging a mating retention portion of the adapter for securing the insert and the adapter in mated engagement.

16. The stripper rubber of claim 14 wherein:
the insert includes a plurality of adapter engagement grooves and a plurality of corresponding rib members;
a space at least as long as said rib member of the adapter is provided between adjacent ones of said rib members of the insert.

17. The stripper rubber of claim 16 wherein
all of said engagement grooves are substantially the same length; and
all of said rib members are substantially the same length.

18. The stripper rubber of claim 17, further comprising:
one or more spring-biased retention pins disposed in the insert and configured for engaging a mating retention portion of the adapter for securing the insert and the adapter in mated engagement.

* * * * *